US008879711B2

(12) United States Patent
Halachmi

(10) Patent No.: US 8,879,711 B2
(45) Date of Patent: *Nov. 4, 2014

(54) METHOD AND APPARATUS FOR NETWORK MAINTENANCE AND SUPERVISION OF A CONTROLLED ON-BOARD AUDIO PORTION

(71) Applicant: Sellaring, Ltd., Raanana (IL)

(72) Inventor: Zohar Halachmi, Raanana (IL)

(73) Assignee: Sellaring, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/869,049

(22) Filed: Apr. 24, 2013

(65) Prior Publication Data

US 2013/0235997 A1   Sep. 12, 2013

Related U.S. Application Data

(63) Continuation of application No. 13/059,973, filed as application No. PCT/IL2009/000640 on Jun. 28, 2009, now Pat. No. 8,503,659.

(60) Provisional application No. 61/090,480, filed on Aug. 20, 2008.

(51) Int. Cl.
H04M 3/00    (2006.01)
H04M 5/00    (2006.01)
(Continued)

(52) U.S. Cl.
CPC .......... *H04M 7/129* (2013.01); *H04M 3/42017* (2013.01); *H04M 3/4878* (2013.01); *H04M 2215/7886* (2013.01); *H04M 15/8044* (2013.01); *H04M 2215/0192* (2013.01); *H04M 1/72519* (2013.01); *G06Q 30/02* (2013.01)
USPC ... 379/263; 379/76; 379/167.08; 379/201.01; 379/207.16; 340/7.51

(58) Field of Classification Search
CPC ................. H04M 1/72519; H04M 2215/0192; H04M 2215/7886; H04M 3/4211; H04M 3/42017; H04M 3/42068; H04M 3/4872; H04M 2207/18; H04M 19/041
USPC .............. 379/70, 76, 82, 88.12, 88.13, 93.03, 379/114.1, 114.13, 142.1, 142.11, 167.08, 379/179, 201.01, 207.02, 207.16, 257, 263, 379/372; 340/7.51; 455/458; 705/10, 14, 705/14.13, 14.25, 14.4
See application file for complete search history.

(56) References Cited

U.S. PATENT DOCUMENTS 4,890,315 A    12/1989   Bendixen et al.
RE34,380 E    9/1993    Sleevi
(Continued)

FOREIGN PATENT DOCUMENTS

EP    1494442 A2    1/2005
EP    1833234 A1    9/2007
(Continued)

OTHER PUBLICATIONS

LiveWire Mobile Flyer, "Off-Portal Ringback", Downloaded Jul. 23, 2008.

(Continued)

*Primary Examiner* — Khai N Nguyen
(74) *Attorney, Agent, or Firm* — Simon Kahn; Chanoch Kahn

(57) ABSTRACT

A method for network maintenance and supervision of an on-board controlled audio agent, the method constituted of: providing a plurality of audio portions, each of the provided audio portions being selected responsive to user descriptive data associated with a call initiator; providing a reimbursement rule associated with each of the audio portions; selecting, for each call instance, a particular one of the plurality of audio portions responsive to the determined reimbursement rules; and outputting the particular one of the plurality of audio portions at each call instance initiation such that at least a portion of the particular audio portion is heard by the call initiator prior to call connection.

20 Claims, 6 Drawing Sheets

(51) Int. Cl.

| | | |
|---|---|---|
| *H04M 3/42* | (2006.01) | |
| *H04M 1/64* | (2006.01) | |
| *H04M 1/60* | (2006.01) | |
| *H04M 9/00* | (2006.01) | |
| *H04M 3/487* | (2006.01) | |
| *H04M 15/00* | (2006.01) | |
| *H04M 7/12* | (2006.01) | |
| *G06Q 30/02* | (2012.01) | |
| *H04M 1/725* | (2006.01) | |

(56) References Cited

U.S. PATENT DOCUMENTS

| | | |
|---|---|---|
| 5,652,784 A | 7/1997 | Blen et al. |
| 5,852,775 A | 12/1998 | Hidary |
| 6,041,116 A | 3/2000 | Meyers |
| 6,385,548 B2 | 5/2002 | Ananthaiyer et al. |
| 6,857,024 B1 * | 2/2005 | Chen et al. ............... 709/231 |
| 6,925,166 B1 | 8/2005 | Chan |
| 6,947,527 B2 | 9/2005 | Clark, Jr. et al. |
| 7,130,392 B2 | 10/2006 | Morton |
| 7,162,226 B2 | 1/2007 | Papulov |
| 7,218,956 B2 | 5/2007 | Okawa |
| 7,224,788 B1 | 5/2007 | Rhee et al. |
| 7,251,476 B2 | 7/2007 | Cortegiano |
| 7,343,009 B1 | 3/2008 | Clark, Jr. |
| 7,512,420 B2 | 3/2009 | Lichtenfeld et al. |
| 8,160,552 B2 | 4/2012 | Stone |
| 8,462,930 B2 | 6/2013 | Halachmi |
| 8,503,659 B2 | 8/2013 | Halachmi |
| 2002/0022476 A1 | 2/2002 | Go |
| 2002/0183048 A1 | 12/2002 | Takeuchi |
| 2003/0050837 A1 | 3/2003 | Kim |
| 2003/0222134 A1 | 12/2003 | Boyd |
| 2005/0021763 A1 | 1/2005 | Izawa |
| 2005/0215238 A1 | 9/2005 | Macaluso |
| 2006/0064350 A1 | 3/2006 | Freer |
| 2006/0259434 A1 | 11/2006 | Vilcauskas et al. |
| 2006/0282783 A1 | 12/2006 | Covell et al. |
| 2007/0121657 A1 * | 5/2007 | Boillot et al. ............... 370/403 |
| 2007/0168462 A1 | 7/2007 | Grossberg et al. |
| 2007/0184820 A1 | 8/2007 | Marshall |
| 2007/0189497 A1 | 8/2007 | Bareis |
| 2007/0263798 A1 * | 11/2007 | Dewing et al. ............ 379/88.13 |
| 2007/0280450 A1 | 12/2007 | Wang |
| 2007/0286401 A1 * | 12/2007 | Siddiqui et al. ............. 379/372 |
| 2008/0025478 A1 * | 1/2008 | Taylor et al. ................ 379/70 |
| 2008/0090562 A1 | 4/2008 | Divis et al. |
| 2008/0120176 A1 * | 5/2008 | Batni et al. ................. 705/14 |
| 2008/0152097 A1 | 6/2008 | Kent |
| 2009/0089144 A1 | 4/2009 | Hodge, Jr. |
| 2009/0089146 A1 | 4/2009 | Teterin |
| 2009/0098891 A1 * | 4/2009 | Park et al. .................. 455/458 |
| 2009/0182616 A1 * | 7/2009 | Ho et al. .................... 705/10 |
| 2010/0135473 A1 | 6/2010 | Dewing et al. |

FOREIGN PATENT DOCUMENTS

| | | |
|---|---|---|
| WO | 0062524 A1 | 10/2000 |
| WO | 0106735 A2 | 1/2001 |
| WO | 0137527 A1 | 5/2001 |
| WO | 2007033358 A2 | 3/2007 |
| WO | 2007057874 A1 | 5/2007 |
| WO | 2007089471 A1 | 8/2007 |
| WO | 2007140017 A2 | 12/2007 |
| WO | 2008020443 A1 | 2/2008 |
| WO | 2008075331 A2 | 6/2008 |
| WO | 2009011618 A2 | 1/2009 |
| WO | 2010020974 A1 | 2/2010 |

OTHER PUBLICATIONS

LiveWire Mobile Flyer, "Advertising Ringback", Downloaded Jul. 23, 2008.

* cited by examiner

METHOD AND APPARATUS FOR NETWORK MAINTENANCE AND SUPERVISION OF A CONTROLLED ON-BOARD AUDIO PORTION

CROSS-REFERENCE TO RELATED APPLICATIONS

The present application is a continuation of U.S. application Ser. No. 13/059,973, now U.S. Pat. No. 8,503,659, which entered national stage on Feb. 19, 2011 from PCT application PCT/IL2009/000640 filed Jun. 28, 2009, entitled "METHOD AND APPARATUS FOR RINGBACK TONE REPLACEMENT WITH DOWNLOADED AUDIO FILES". U.S. application Ser. No. 13/059,973 claims priority from U.S. provisional application 61/090,480 filed Aug. 20, 2008, entitled "METHOD AND APPARATUS FROM NETWORK MAINTENANCE AND SUPERVISION OF AN ON-BOARD CONTROLLED AUDIO PORTION". The entire contents of each of the above are incorporated herein by reference

BACKGROUND

The invention relates generally to the field of telephone communications and in particular to a method and apparatus for network maintenance and supervision of a local telephone agent providing controlled audio to a caller until detection of call completion or failure.

Bi-directional voice communication, where one party may select a second party for communication, is generally known as telephone communication. Telephone communication originated with a direct wire connection between the calling party, i.e. the call initiator, and the called party, i.e. the second party, and a switchboard system was developed to enable set up and tear down of connections between the calling party and the called party.

The switchboard system was replaced with automated switching systems, and voice communication developed into a world spanning interconnected set of voice networks. The term telephone, and telephone network, as used throughout this document includes both fixed telephones and mobile phones, as well as voice communication carried apart from dedicated voice networks, including without limitation voice communication carried by Voice over Internet protocol, irrespective as to whether one or more of the parties is communicating by telephone, computer or other device providing voice communication.

Different telephone networks have been seamlessly interconnected, allowing for telephone communication to be initiated from any voice capable station around the world, for connection to any other voice capable station. In most telephone communication systems, an initiating party enters some identification of the party to be called, i.e. the second party, and the telephone network associated with the initiating party begins to set up the call by first identifying the telephone network of the second party, in the event that the second party is not associated with the same telephone network, and then arranging a voice communication path in accordance with the appropriate protocols. Some method of signaling the second party is typically provided by the telephone network associated with the second party, and the second party may select to participate in the telephone communication by signaling a willingness to respond, such as by raising the telephone receiver or pressing the connect button on a mobile telephone. Upon signaling the willingness to respond, a telephone communication channel is typically designated, allowing for bi-directional voice communication.

From the time that the initiating party enters the identification of the party to be called until the telephone communication channel is actually designated there is a time lag. Historically, an audio ring back was provided by the telephone network associated with the called party, with the ring back signal being received at the initiating party telephone instrument and output by an audio output device, such as a speaker. The ring back signal provides audio confirmation that an attempt to access the called party was in progress.

The ring back signal was originally generated by the various telephone networks. Recently, various mobile telephone networks, and suppliers, have implemented personalized ring back tunes, wherein a called party's telephone sends a particular music selection as a ring back signal while signaling the called party. Significant revenue has been generated for the mobile telephone networks by the sales of these downloadable ring back tunes.

Companies such as NMS Communications of Framingham, Mass., have further introduced advertising ring back. Such a service enables a called party's telephone to transmit an advertisement as the ring back signal. Unfortunately, incoming calls are received on a seemingly random basis, with no ability for advertisers to target those receiving the advertisement ring back signal. All callers, irrespective of relevance to the advertiser's message, receive the advertisement when they call a telephone which has been signed up for the service.

U.S. Pat. No. 7,224,788 issued May 29, 2007 to Rhee et al., the entire content of which is incorporated herein by reference, is addressed to a voice/text/image commercial information generating method and device operative while waiting for a communication channel to be established. The voice/text/image commercial information generating method and device is associated with one of the telephone network of the initiating telephone, and the telephone network of the called party.

Disadvantageously, in the event that commercial information is generated, no criteria are supplied to arrange for an appropriate advertising mix. In the absence of such an advertising mix, users will quickly tune out the advertisement, or arrange to have the service discontinued. It is interesting to note that Rhee provides for a ring back tone hearing mode, which effectively bypasses any such voice/text/image commercial information.

SUMMARY

Accordingly, it is a principal object of the present invention to overcome at least some of the disadvantages of the prior art. In certain embodiments this is provided by a telephone exhibiting an on-board controlled audio agent. In one embodiment the on-board controlled audio agent is constituted of machine readable instructions stored within the calling telephone and run by a processor of the telephone. A call condition classifier is further provided, either within the telephone, or associated with a telephone network of the initiating telephone. The call condition classifier monitors the condition of the call as the called party is contacted, and classifies the condition of the call as one of awaiting a response, answered and failed. Preferably only upon detection of a human voice response or an answering service response is the call condition determined as answered.

Upon initiation of a telephone call by the initiating telephone, the on-board controlled audio agent outputs a selected one of a plurality of audio portions, and maintains the selected audio portion until the call condition is identified as one of answered and failed. In the event that the call condition is identified as answered, the audio portion is discontinued, and the telephone channel between the initiating telephone and the called telephone is enabled.

In certain embodiments the plurality of audio portions are constituted of advertisements. In certain embodiments associated text, an image or images or a video portion may be further associated with the audio portion for display on a telephone display of the caller.

In certain embodiments, associated with each of the audio portions is at least one reimbursement rule, and the controlled audio agent is operative to select the audio portion responsive to the reimbursement rules. Preferably the controlled audio agent is operative to select the audio portion so as to maximize total reimbursement responsive to the reimbursement rules. In certain embodiments, the controlled audio agent is further operative to prevent repetitive replay of a particular one of said plurality of audio portions overriding the drive to maximize total reimbursement.

In certain embodiments the controlled audio agent maintains a history of audio portions output to the caller, and uploads the history to a network maintenance and supervision agent. The network maintenance and supervision agent is operative to regularly provide updated reimbursement rules and audio portions responsive to the uploaded history. Preferably, the audio portions and reimbursement rules are responsive to user descriptive data of the caller. Preferably user descriptive data comprises at least one of: age, sex, income, job description and preferred hobby.

In certain embodiments a method for network maintenance and supervision of an on-board controlled audio agent is provided, the method comprising: providing a plurality of audio portions, each of the provided audio portions being selected responsive to user descriptive data associated with a call initiator; providing a reimbursement rule associated with each of the audio portions; selecting, for each call instance, a particular one of the plurality of audio portions responsive to the determined reimbursement rules; and outputting the particular one of the plurality of audio portions at each call instance initiation such that at least a portion of the particular audio portion is heard by the call initiator prior to call connection.

In certain embodiments a system for network maintenance and supervision of a locally controlled audio portion is provided, the system comprising: a controlled audio agent on-board a telephone; a memory associated with the controlled audio agent, the memory exhibiting a plurality of audio portions stored thereon responsive to the controlled audio agent; and a network maintenance and supervision agent associated with a telephone network, the network maintenance and supervision agent operative to provide each of the provided audio portions to the controlled audio agent responsive to user descriptive data associated with a caller, each of the provided audio portions having associated therewith a reimbursement rule associated with each of the audio portions, the controlled audio agent operative to: select, for each call instance, a particular one of the plurality of audio portions responsive to the reimbursement rules; and output the particular one of the plurality of audio portions at each call instance initiation such that at least a portion of the particular audio portion is heard by the call initiator prior to call connection.

Additional features and advantages of the invention will become apparent from the following drawings and description.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
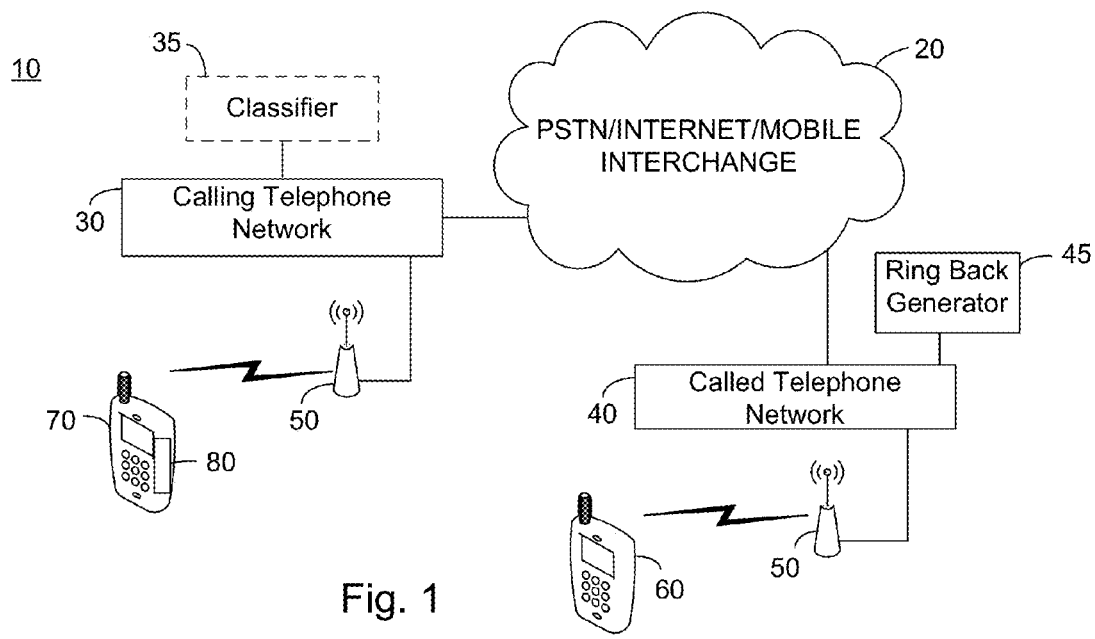
FIG. 1 illustrates a high level schematic diagram of a communication system connecting a calling telephone and a called telephone.

Certain of the present embodiments enable a telephone exhibiting an on-board controlled audio agent. In one embodiment the on-board controlled audio agent is constituted of machine readable instructions stored within the calling telephone and run by a processor of the telephone. A call condition classifier is further provided, either within the telephone, or associated with a telephone network of the initiating telephone. The call condition classifier monitors the condition of the call as the called party is contacted, and classifies the condition of the call as one of awaiting a response, answered and failed. Preferably only upon detection of a human voice response or an answering service response is the call condition determined as answered.

Upon initiation of a telephone call by the initiating telephone, the on-board controlled audio agent outputs a selected one of a plurality of audio portions, and maintains the selected audio portion until the call condition is identified as one of answered and failed. In the event that the call condition is identified as answered, the audio portion is discontinued, and the telephone channel between the initiating telephone and the called telephone is enabled.

In certain embodiments the plurality of audio portions are constituted of advertisements. In certain embodiments associated text, an image or images or a video portion may be further associated with the audio portion for display on a telephone display of the caller.

In certain embodiments, associated with each of the audio portions is at least one reimbursement rule, and the controlled audio agent is operative to select the audio portion responsive to the reimbursement rules. Preferably the controlled audio agent is operative to select the audio portion so as to maximize total reimbursement responsive to the reimbursement rules. In certain embodiments, the controlled audio agent is further operative to prevent repetitive replay of a particular one of said plurality of audio portions overriding the drive to maximize total reimbursement.

In certain embodiments the controlled audio agent maintains a history of audio portions output to the caller, and uploads the history to a network maintenance and supervision agent. The network maintenance and supervision agent is operative to regularly provide updated reimbursement rules and audio portions responsive to the uploaded history. Preferably, the audio portions and reimbursement rules are responsive to user descriptive data of the caller. Preferably user descriptive data comprises at least one of: age, sex, income, job description and preferred hobby.

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

FIG. 1 illustrates a high level schematic diagram of a communication system 10 comprising a PSTN/Internet/Mobile interchange 20, a calling telephone network 30, an optional call condition classifier 35, a called telephone network 40, a ring back generator 45, a plurality of cellular antennas 50, a called telephone 60 and a calling telephone 70 comprising therein an on-board controlled audio agent 80. PSTN/Internet/Mobile interchange 20 is in communication with calling telephone network 30 and with called telephone network 40. Calling telephone network 30 is in communication with optional call condition classifier 35 and called telephone network 40 is in communication with ring back generator 45. Calling telephone network 30 is in communication with a plurality of cellular antennas 50, and in particular with the cellular antenna 50 which is in communication with calling telephone 70. Called telephone network 40 is in communication with a plurality of cellular antennas 50, and in particular with the cellular antenna 50 which is in communication with called telephone 60.

Ring back generator 45 is illustrated as a component in communication with called telephone network 40, however this is not meant to be limiting in any way. In one embodiment, ring back generator 45 is embedded within called telephone network 40, and in another embodiment ring back generator 45 is provided by called telephone 60.

In operation, a call instance is initiated from calling telephone 70. Calling telephone network 30 receives a call initiation signal from calling telephone 70 via cellular antenna 50, and is operative to request from called telephone network 40, via PSTN/Internet/Mobile interchange 20, to enable a telephone channel between calling telephone 70 and called telephone 60. Such a channel is enabled cooperatively between calling telephone network 30 and called telephone network 40, and is completed upon called telephone 60 answering. The channel is released upon completion of the telephone call.

The term telephone channel as used herein is not meant to be limiting to a fixed time domain multiplexed channel, and is particularly meant to include a logical channel, such as the logical channel implement by VoIP.

While calling telephone network 30, in cooperation with called telephone network 40, attempts to enable the telephone channel between calling telephone 70 and called telephone 60, on-board controlled audio agent 80 outputs a selected audio portion from calling telephone 70, and blocks any received audio from the called telephone 60 and/or called telephone network 40. A user at calling telephone 70 thus does not hear the output of ring back generator 45, which is operative to generate a ring back tone responsive to signaling of called telephone 60. Optional call condition classifier 35 is in communication with calling telephone network 30 and is operative to continuously monitor the condition of the telephone call. In particular, optional call condition classifier 35 is preferably operative to classify the condition of the call as one of answered, awaiting voice response and failed. Preferably only upon detection of a human voice response or an answering service response is the call condition determined as answered. Call condition classifier 35 is in data communication with on-board controlled audio agent 80, and notifies on-board controlled audio agent 80 of the classified condition of the call. Upon notification from call condition classifier 35 that the call condition is classified as answered, on-board controlled audio agent 80 ceases to output the selected audio portion and enables audio output of the answered telephone channel.

Figure 2:
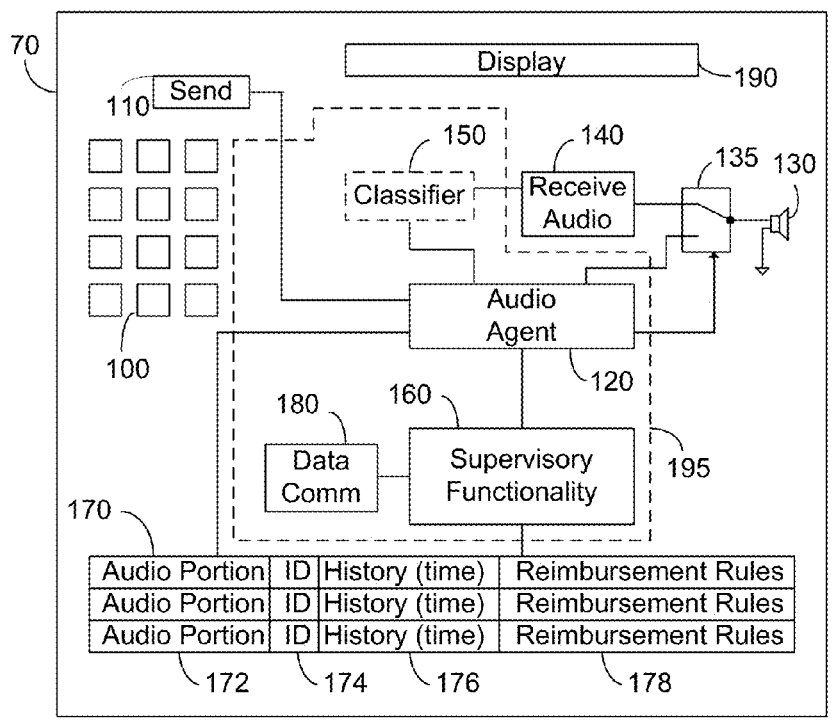
FIG. 2. illustrates a high level schematic diagram of the calling telephone of FIG. 1 providing a controlled audio portion to a caller according to an exemplary embodiment.

FIG. 2 illustrates a high level schematic diagram of an embodiment of calling telephone 70 of FIG. 1 comprising: a keypad 100; a send button 110; an on-board controlled audio agent 120; a speaker 130; an audio switch mechanism 135; a receive audio mechanism 140; an optional call condition classifier 150; a supervisory functionality 160; a memory 170; a data communication module 180; and a display 190. Memory 170 preferably comprises an audio portion storage 172, an identifier storage 174, a history storage 176 and a reimbursement rules storage 178.

In one embodiment the combination of on-board controlled audio agent 120, optional call condition classifier 150, supervisory functionality 160 and data communication module 180 constitutes a telephone agent 195. In another embodiment (not shown), telephone agent 195 is constituted of on-board controlled audio agent 120 in cooperation with optional call condition classifier 35.

Respective connections of on-board controlled audio agent 120 are coupled to send button 110, supervisory functionality 160, audio portion storage 170, the control input of audio switch mechanism 135, a first audio input of audio switch mechanism 135 and optional call condition classifier 150. Supervisory functionality 160 is coupled to audio portion storage 170 and data communication module 180. Receive audio mechanism 140 is connected to a second audio input of audio switch mechanism 135. Speaker 130 is connected to the output of audio switch mechanism 135. In one non-limiting embodiment, at least one of on-board controlled audio agent 120; optional call condition classifier 150; supervisory functionality 160; and data communication module 180 is implemented as a software code providing the respective functionality, the software code being run on a processor of telephone 70.

The above has been described in relation to an implementation comprising a dedicated send button 110, however this is not meant to be limiting in any way. In particular the use of a soft button, or automated dialing software is particularly contemplated. The term send button 110 is thus descriptive of a functionality operative to initiate a phone call and not a particular key.

In operation, audio switch mechanism 135 is operative, responsive to a signal at the control input of audio switch mechanism 135 provided by on-board controlled audio agent 120, to alternately pass the audio output of on-board controlled audio agent 120 to speaker 130 and the audio output receive audio mechanism 140 to speaker 130.

Upon call initiation by a user via keypad 100 and send button 110, on-board controlled audio agent 120 is operative to control audio switch mechanism 135 to connect to the audio output of on-board controlled audio agent 120 to speaker 130. On-board controlled audio agent 120 is further operative, preferably responsive to supervisory functionality 160 to output a selected audio portion from the plurality of audio portions stored in audio portion storage 172 of memory 170 for output at speaker 130. In one embodiment, supervisory functionality 160 is further operative to store history information of the selected audio portion in history portion 176 of memory 170, associated with an identifier of the selected audio portion stored in identifier storage 174, and the length of time the selected audio portion was provided for output at speaker 130. In another embodiment, supervisory functionality 160 is further operative to maintain reimbursement rules associated with each of the audio portions and store the reimbursement rules in reimbursement rules storage 178. In one embodiment, the particular audio portion selected from audio portion storage 172 is selected responsive to the reimbursement rules stored in reimbursement rules storage 178.

The contents of memory 170 is not static, and both the audio portions stored in audio portions storage 172, the respective identifiers store in identifier storage 174 and the reimbursement rules stored in reimbursement rules storage 178 may be changed responsive to a received data via data communication module 180, as will be described further hereinto below.

Optional call condition classifier 150 is operative as described above in relation to optional call condition classifier 35 of FIG. 1, and in one embodiment only one of optional call condition classifier 35 and optional call condition classifier 150 is provided. In the event that optional call condition classifier 35 is provided at the network side, data from optional call condition classifier 35 is provided to on-board controlled audio agent 120 via data communication module 180 and supervisory functionality 160.

Receive audio mechanism 140 receives audio from called telephone 60 or called telephone network 40 and transfers it to optional call condition classifier 150. The received audio is not transferred to speaker 130 because audio switch mechanism 135 is connected to pass audio from on-board controlled audio agent 120. One of optional call condition classifier 35 and optional call condition classifier 150 continuously monitors the condition of the call as the called party is contacted, and classifies the condition of the call as one of awaiting a response, answered and failed. Preferably only upon detection of a human voice response or an answering service response is the call condition determined as answered. In the event that one of optional call condition classifier 35 and optional call condition classifier 150 classifies the condition of the call as awaiting a response, on-board controlled audio agent 120 maintains the output of the selected audio portion at speaker 130. In the event that one of optional call condition classifier 35 and optional call condition classifier 150 classifies the condition of the call as answered, on-board controlled audio agent 120 enables audio switch mechanism 135 to connect receive audio mechanism 140 to speaker 130, thereby outputting received audio of the telephone channel. In the event that one of optional call condition classifier 35 and optional call condition classifier 150 classifies the condition of the call as failed, audio agent 120 disables the selected audio portion, optionally after completing a predetermined minimum section thereof, and a failure message is output at the telephone.

The above has been described in an embodiment in which only an audio portion is sent to speaker 130 until call answer or failure, however this is not meant to be limiting in any way. In another embodiment, additionally at least one of an associated text, an associated image and an associated video portion is further output on display 190 of calling telephone 70. Optionally, a user may respond to one of the audio portion, associated text, associated image and associated video portion by providing an input at keypad 100. In one embodiment the user input is stored and acted upon by supervisory functionality 160 after completion of the telephone call. In one particular embodiment the audio portion represents an advertisement. In one particular further embodiment, the user input at keypad 100 may present an entry to a purchasing system, or may initiate the transmission of a discount or rebate instrument such as a coupon. In another particular embodiment, the user input at keypad 100 may initiate entry into a survey with a concomitant chance reward. Preferably, any such response from the user is further stored in history storage 176.

Optional call classifier 35 and optional call classifier 150 are in one embodiment in accordance with the teaching of one or more of: U.S. Pat. No. 6,041,116 issued Mar. 21, 2000 to Meyers; U.S. Pat. No. 6,385,548 issued May 7, 2002 to Ananthaiyer et al; and U.S. Pat. No. 6,925,166 issued Aug. 2, 2005 to Chan, the entire contents of each of which are incorporated herein by reference.

Figure 3A:
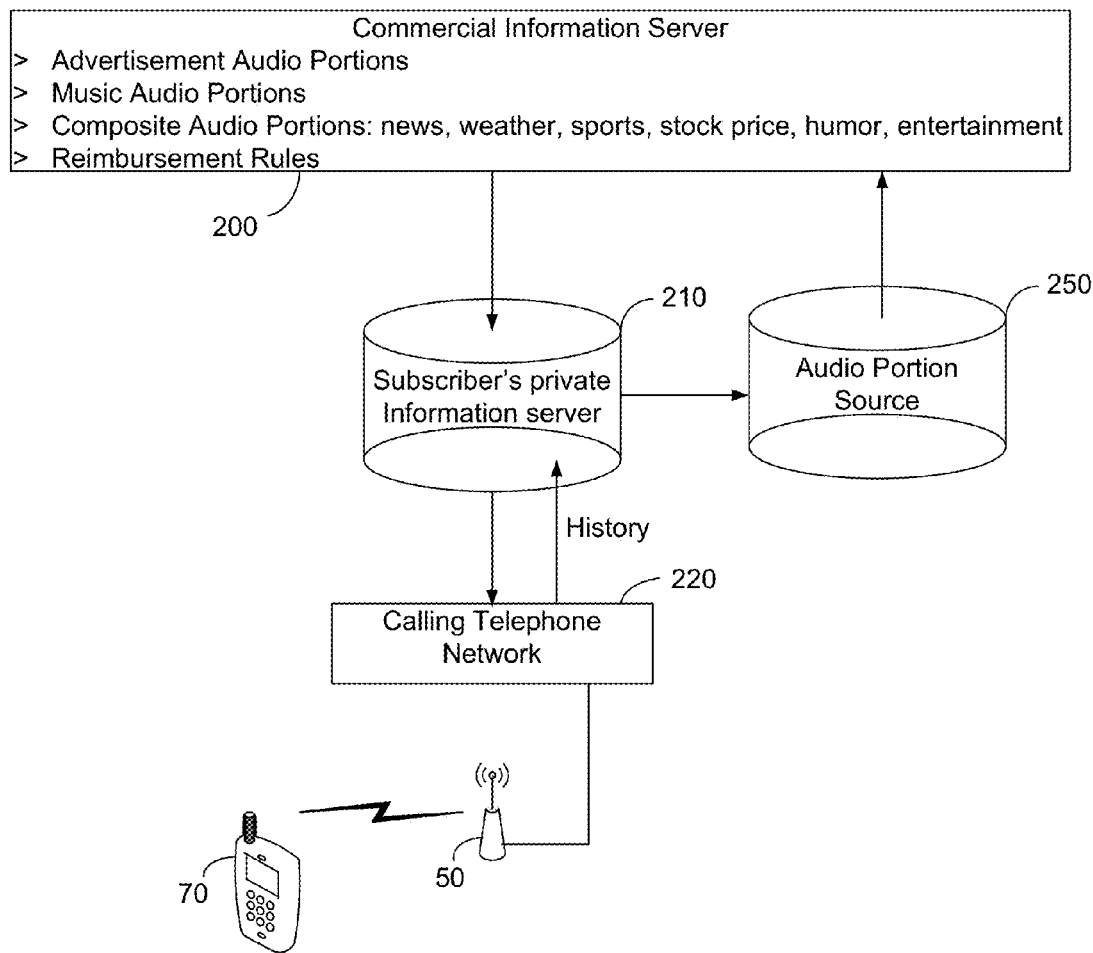
FIG. 3A illustrates a high level schematic diagram of a communication system connecting a subscribed telephone and a commercial information server according to an exemplary embodiment.

FIG. 3A illustrates a high level schematic diagram of a communication system comprising a commercial information server 200, a subscriber's private information server 210, a calling telephone network 220, an audio portion source 250, a cellular antenna 50 and a calling telephone 70. Commercial information server 200 comprises a plurality of audio portions. In one embodiment the plurality of audio portions comprises at least one of advertisements, music and composite information such as news, weather, sports, stock prices, humor and entertainment. Commercial information server 200 further comprises reimbursement rules associated with each of the plurality of audio portions. There is no requirement that the reimbursement rules be static, and in one embodiment commercial information server 200 is further operative to transfer a composite of history information received from each of the supervisory functionalities 160 of the various telephone's 70 to audio portion source 250, and in response a change in reimbursement rules or audio portion may be sent by audio portion source 250 to commercial information server 200.

Subscriber's private information server 210 comprises user descriptive data such as at least one of age, sex, income, job description and preferred hobby. Subscriber's private information server 210 is in communication with commercial information server 200 and via calling telephone network 220 each of the subscribing telephones 70. Calling telephone network 220 is in communication with calling telephone 70 via cellular antenna 50.

In operation, responsive to user descriptive data stored on subscriber's private information server 210, selected audio portions from commercial information server 200 and optional related reimbursement rules are downloaded to telephones 70 whose user descriptive data matches a target profile. In one embodiment, the reimbursement rules are sensitive to certain user descriptive data, and no reimbursement is offered for subscriber's whose user descriptive data stored on subscriber's private information server 210 does not match a desired profile.

In general, the combination of subscriber's private information server 210 and commercial information server 200 functions as a network maintenance and supervision agent to deliver selected audio portions and reimbursement rules consonant with user descriptive data stored on subscriber's private information server 210.

Figure 3B:
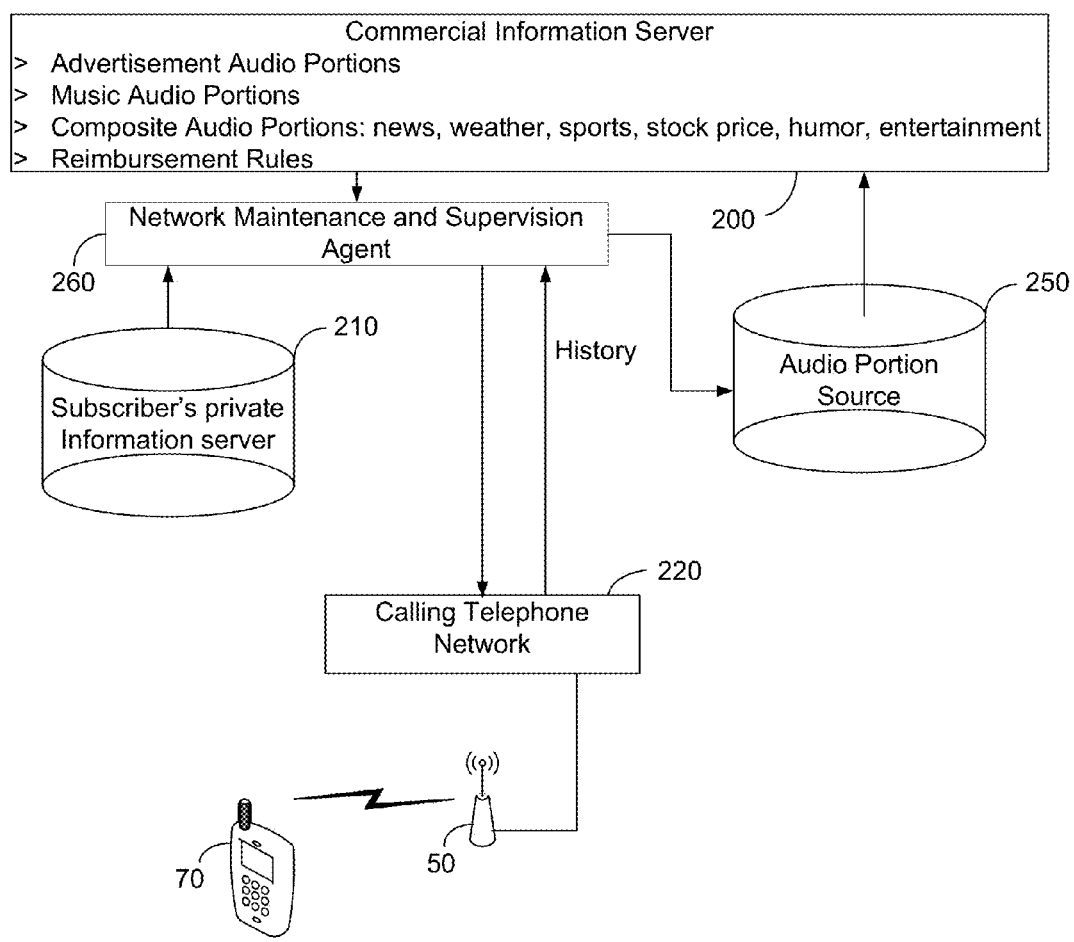
FIG. 3B illustrates a high level schematic diagram of a communication system connecting a subscribed telephone, a network maintenance and supervision agent and a commercial information server according to an exemplary embodiment.

FIG. 3B illustrates a high level schematic diagram of a communication system comprising a commercial information server 200, a subscriber's private information server 210, a calling telephone network 220, an audio portion source 250, a network maintenance and supervision agent 260, a cellular antenna 50 and a calling telephone 70. Commercial information server 200 comprises a plurality of audio portions. In one embodiment the plurality of audio portions comprises at least one of advertisements, music and composite information such as news, weather, sports, stock prices, humor and entertainment. Commercial information server 200 further comprises reimbursement rules associated with each of the plurality of audio portions.

Subscriber's private information server 210 is in communication with network maintenance and supervision agent 260, and is in communication with a subscriber associated with calling telephone 70 via a network such as the Internet (not shown). Network maintenance and supervision agent 260 is in communication with each of commercial information server 200, each calling telephone 70 via calling telephone network 220 and audio portion source 250. Audio portion source 250 is further in communication with commercial information server 200. A single audio portion source 250 is illustrated, however this is not meant to be limiting in any way, and a plurality of independent audio portion sources 250 is specifically contemplated.

In operation, subscriber's private information server 210 comprises user descriptive data, preferably comprising at least one of age, sex, income, job description and preferred hobby for each calling telephone 70 associated with calling telephone network 220 for which a subscription to the service associated with commercial information server 200 has been arranged. There is no requirement that each calling telephone 70 subscribe to the service associated with commercial information server 200. Subscription to the service associated with commercial information server 200 is in one embodiment accomplished via a web page, at which user descriptive data is entered.

Network maintenance and supervision agent 260 is operative to download to each calling telephone 70 associated with calling telephone network 200, for which information is found on subscriber's private information server 210, a plurality of selected audio portions from commercial information server 200, the plurality of audio portions being selected for downloading responsive to the user descriptive data on subscriber's private information server 210. Network maintenance and supervision agent 260 is further operative to download to each calling telephone reimbursement rules associated with each of the downloaded audio portions, the reimbursement rules defining remuneration to the subscriber associated with calling telephone 70. Preferably, the reimbursement rules are further responsive to the user descriptive data on subscriber's private information server 210. In particular, the audio portions selected are preferably those for which user descriptive data matches a target profile. In one embodiment, the reimbursement rules are sensitive to certain user descriptive data, and no reimbursement is offered for subscribers whose user descriptive data stored on subscriber's private information server 210 does not match a desired profile.

Network maintenance and supervision agent 260 is further operative to automatically upload from each calling telephone 70, preferably on a periodic basis, history information associated with each of the downloaded audio portions, as described above in relation to history storage 176 of FIG. 2. In certain embodiments, network maintenance and supervision agent 260 is further operative to consolidate history information from a plurality of calling telephones 70, and provide the consolidated history information to audio portion source 250. In an embodiment in which a plurality of audio portion sources 250 are supplied, the consolidated history information for each audio portion is preferably supplied to the sourcing audio portion source 250.

Audio portion source 250 is operative to upload to commercial information server 200 updated audio portions and/or reimbursement rules. The updated audio portions and/or reimbursement rules may be uploaded on a scheduled basis, or responsive to consolidated history information. In one non-limiting example, in which an uploaded consolidated history comprises information regarding user inputs received, as described above in relation to FIG. 2, audio portion source 250 updates one or more of the audio portions and reimbursement rules stored on commercial information server 200 responsive to information regarding user inputs.

The above has been described in an embodiment in which a consolidated history report is supplied to audio portion source 250, however this is not meant to be limiting in any way. In another embodiment particular information regarding selected subscribers and their associated history is provided to audio portion source 250.

Figure 4:
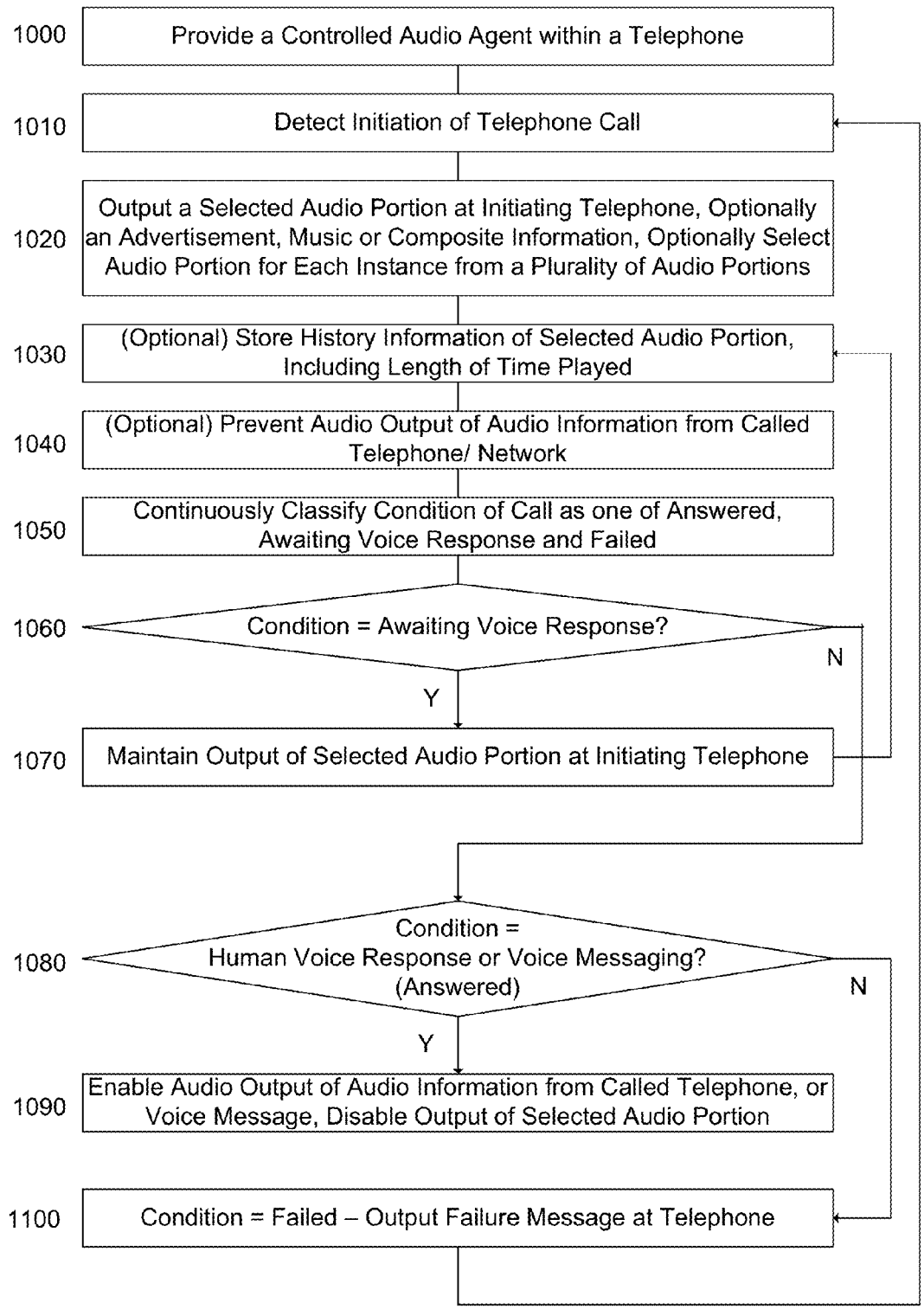
FIG. 4 illustrates a high level flow chart of a method of providing a controlled audio portion to a caller according to an exemplary embodiment.

FIG. 4 illustrates a high level flow chart of a method of providing a controlled audio portion to a caller according to an exemplary embodiment. In stage 1000 a controlled audio agent is provided within a telephone, such as on-board controlled audio agent 120 of FIG. 2. In stage 1010 initiation of a telephone call is detected. In stage 1020 a selected audio portion is output at the initiating telephone. Optionally the selected audio portion is an advertisement, music or composite information, however there is no requirement that all of the audio portions be of the same category. Optionally the selected audio portion for each instance of a call initiation is selected from a plurality of audio portions. In one embodiment, additionally at least one of an associated text, an associated image and an associated video portion is further output on a display of calling telephone. In another embodiment, a user input responsive to the audio portion is stored to be acted upon after completion of the call.

In optional stage 1030 history information of the selected audio portion, including the length of time played, is stored. In optional stage 1040 the output of audio information received from the called telephone or called telephone network is prevented. In stage 1050 the condition of the call is continuously classified as one of answered, awaiting voice response and failed.

In stage 1060 the call condition of stage 1050 is compared to determine if the condition of the call condition is awaiting voice response. In the event that the condition of the call is awaiting voice response, in stage 1070 the output of the selected audio portion at the initiating telephone is maintained and stage 1030, as described above, is performed.

In the event that in stage 1060 the call condition is not awaiting voice response, in stage 1080 the condition of the call is further compared to determine if the call condition is answered, i.e., a human voice or voice messaging has been detected. In the event that the call condition is answered, in stage 1090 the output of audio information from the called telephone or a voice message from the called telephone network or called telephone is enabled, and the output of the selected audio portion is disabled.

In the event that in stage 1080 the condition of the call is not answered, i.e., the condition of the call is failed, in stage 1100 a failure message is output at the calling telephone and stage 1010, as described above, is performed. In one embodiment a text message indicative of a failed call is further displayed. In one embodiment, in the event of a failed call, a predetermined minimum section of the selected audio portion is output prior to outputting the failure message of stage 1100.

Figure 5:
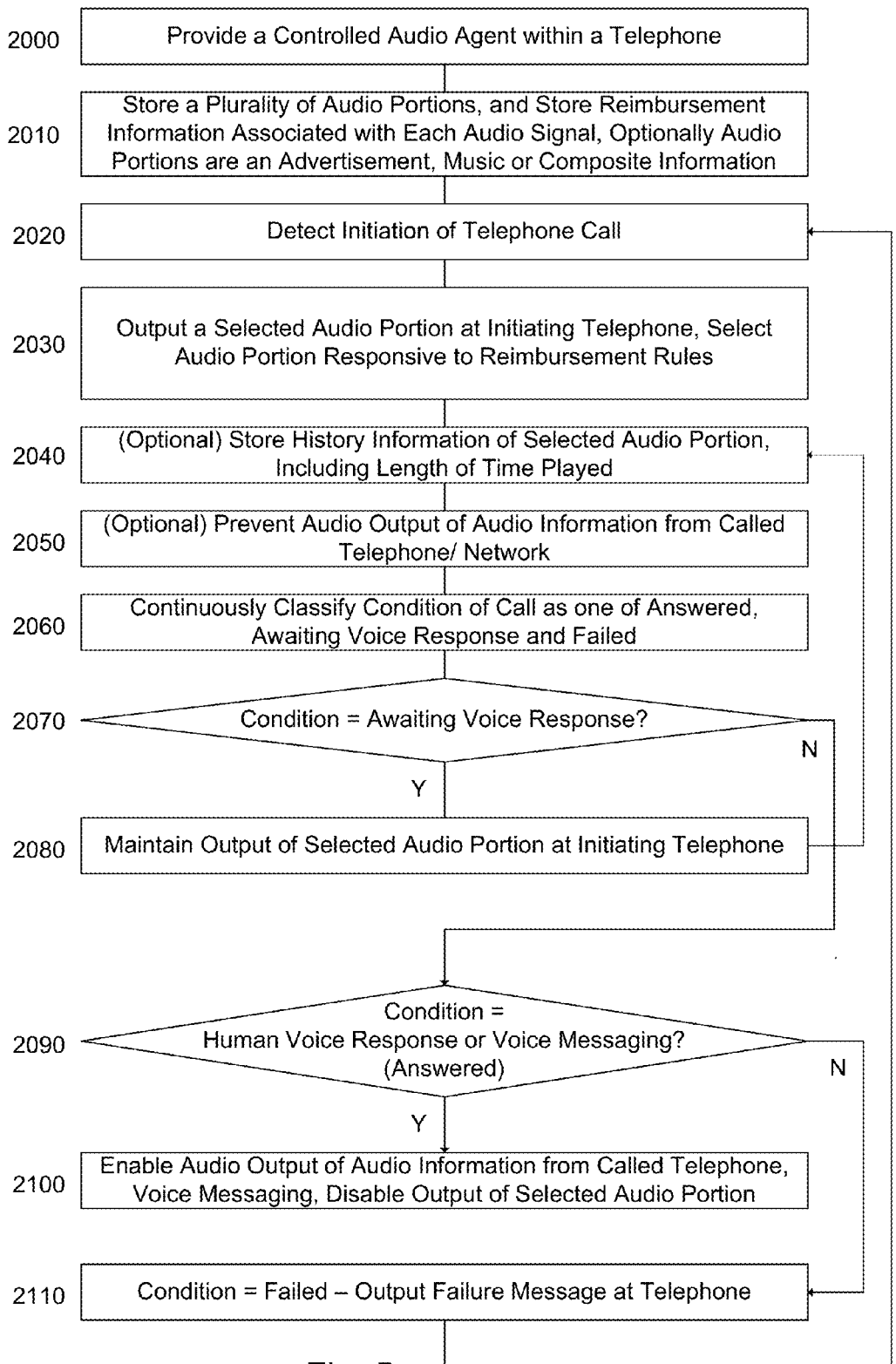
FIG. 5 illustrates a high level flow chart of a method of selecting the provided audio portion according to an exemplary embodiment.

FIG. 5 illustrates a high level flow chart of a method of selecting the provided audio portion according to an exemplary embodiment. In stage 2000 a controlled audio agent is provided within a telephone, such as on-board controlled audio agent 120 of FIG. 2. In stage 2010 a plurality of audio portions and reimbursement information associated with each audio portion is stored. The audio portions preferably comprise one of an advertisement, music and composite information, however there is no requirement that all of the audio portions be of the same category. In stage 2020 initiation of a telephone call is detected. In stage 2030 a selected audio portion is output at the initiating telephone, the selected audio portion being selected responsive to the stored reimbursement rules. Optionally the selected audio portion is an advertisement. In one embodiment, additionally at least one of an associated text, an associated image and an associated video portion is further output on a display of the calling telephone. In another embodiment, a user input responsive to the selected audio portion is stored to be acted upon after completion of the call.

In optional stage 2040 history information of the selected audio portion, including the length of time played, is stored. In one embodiment, the history information further comprises user feedback as described above in relation to FIG. 2. In optional stage 2050 the output of audio information received from the called telephone or called telephone network is prevented. In stage 2060 the condition of the call is continuously classified as one of answered, awaiting voice response and failed.

In stage 2070 the call condition of stage 2060 is compared to determine if the condition of the call condition is awaiting voice response. In the event that the condition of the call is awaiting voice response, in stage 2080 the output of the selected audio portion at the initiating telephone is maintained and stage 2040, as described above, is performed.

In the event that in stage 2070 the call condition is not awaiting voice response, in stage 2090 the condition of the call is further compared to determine if the call condition is answered, i.e., a human voice or voice messaging has been detected. In the event that the call condition is answered, in stage 2100 the output of audio information from the called telephone or a voice message from the called telephone network or called telephone is enabled, and the output of the selected audio portion is disabled.

In the event that in stage 2090 the condition of the call is not answered, i.e., the condition of the call is failed, in stage 2110 a failure message is output at the calling telephone and stage 2020, as described above, is performed. In one embodiment a text message indicative of a failed call is further displayed. In one embodiment, in the event of a failed call, a predetermined minimum section of the selected audio portion is output prior to outputting the failure message of stage 2110.

Figure 6:
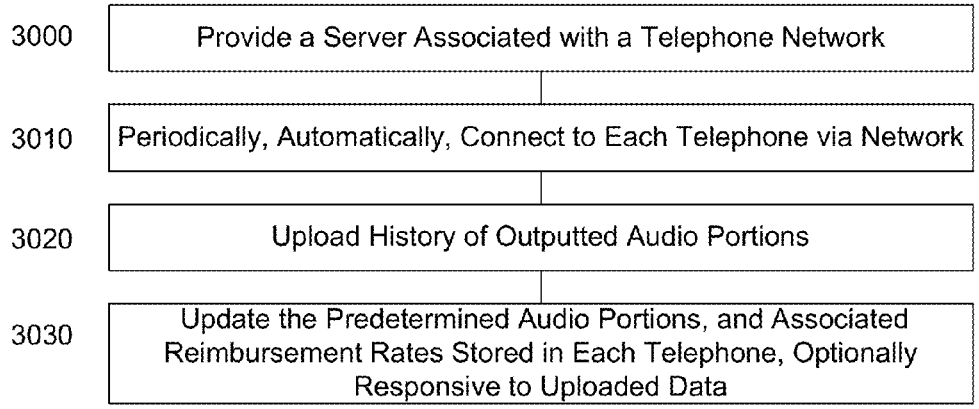
FIG. 6 illustrates a high level flow chart of a method of updating the stored audio portions and associated reimbursement rules according to an exemplary embodiment.

FIG. 6 illustrates a high level flow chart of a method of updating the stored audio portions and associated reimbursement rules according to an exemplary embodiment. In stage 3000 a server is provided, the provided server associated with a telephone network. In one embodiment, the server of stage 3000 comprises a combination of commercial information server 200 and subscriber's private information server 210 of FIG. 3.

In stage 3010 the provided server of stage 3000 connects automatically to each of the telephones in the network via the calling network, preferably on a periodic basis. In another embodiment the provided server connects with telephones in the network responsive to events, such as a certain number of calls made by each of the respective telephones. In stage 3020 the history of the outputted selected audio portions and associated reimbursement rules, such as that stored on history storage 176 of FIG. 2 is uploaded to the server. In stage 3030 the plurality of audio portions and reimbursement rules are updated for each telephone, preferably by downloading revised information for storage in audio portion storage 172 and reimbursement rules storage 178. Optionally, the updated information is responsive to the data uploaded in stage 3020.

Figure 7:
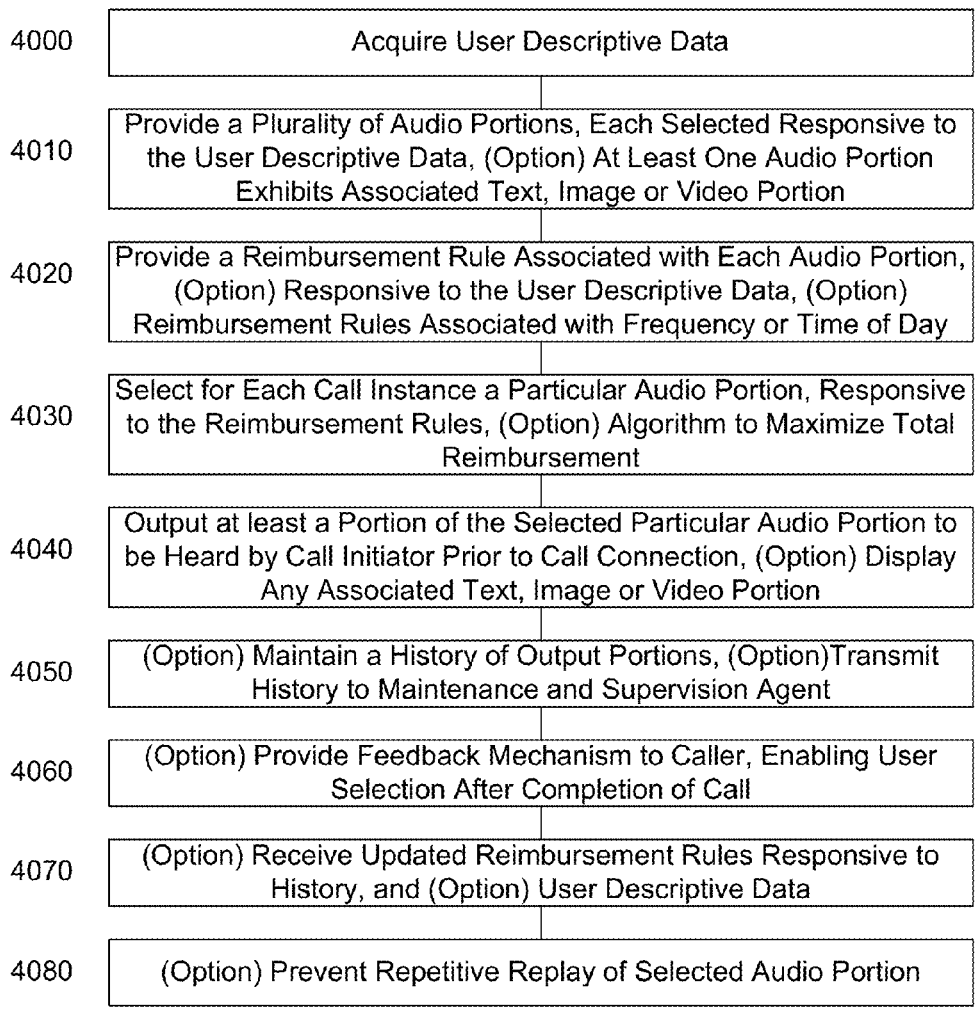
FIG. 7 illustrates a high level flow chart of a method of network maintenance and supervision of an on-board controlled audio agent according to an exemplary embodiment.

FIG. 7 illustrates a high level flow chart of a method of network maintenance and supervision of an on-board controlled audio agent according to an exemplary embodiment. In one particular embodiment, the method of FIG. 7 is associated with the communication system of FIG. 3B. In stage 4000, user descriptive data for a user is acquired. Preferably, the user descriptive data is acquired associated with a particular telephone.

In stage 4010, a plurality of audio portions is provided to each of the telephones, each of the plurality of audio portions being selected responsive to the user descriptive data of stage 4000. The audio portions preferably comprise one of an advertisement, music and composite information, however there is no requirement that all of the audio portions be of the same category. Optionally, at least one of the audio portions has further associated therewith an associated text, image or video portion, or a combination thereof, for display on the telephone.

In stage 4020, a reimbursement rule associated with each of provided audio portions of stage 4010 is provided to the telephone. Optionally, the reimbursement rules are responsive to the user descriptive data of stage 4000. In particular, for each audio portion a particular reimbursement rule is provided. There is no requirement that the reimbursement rule be of a single function, and complex reimbursement rules are particularly anticipated. In one non-limiting example, reimbursement rules are associated with one or more of frequency of output of the associated audio portion and time of day of output of the associated audio portion.

In stage 4030, for each call instance of each telephone, where the telephone is the call initiator, a particular audio portion of the provided plurality of audio portions of stage 4010 is selected for output to be heard by the call initiator prior to call connection. The audio portion is selected responsive to the provided reimbursement rules of stage 4020. Optionally, the audio portion is selected in accordance with an algorithm to maximize total reimbursement. Thus, the audio portions are selected so as to maximize reimbursement to the user.

In stage 4040, at least a portion of the selected audio portion is output to the user. In particular, upon call initiation the selected audio portion is promptly initiated, and as described above in relation to each of FIGS. 2, 4 and 5, audio output from the called telephone or called telephone network is blocked until the call is answered. The length of the portion of the selected audio portion output is in one embodiment a function of the time elapsed from call initiation until a voice response from the called telephone is detected. In the event of a failure of the call to be completed, in one embodiment a predetermined length of the selected audio portion is output. Optionally, concurrent with the output of the selected audio portion, any associated text, image or video portion is output on a display of the telephone.

In optional stage 4050, a history of the output audio portion is maintained, preferably comprising the length of the audio portion which was output. In one embodiment, the history further comprises a complete time history including times of day in which the audio portion was output, and number of times the audio portion was output. Optionally, the history information is further transmitted automatically to a network maintenance and supervisory agent.

In optional stage 4060, a feedback mechanism is further provided for at least some of the audio portions, enabling the call initiator to respond to the audio portion, and/or the optional associated text, image or video portion. Any user input is preferably stored with the history information of stage 4050. In one embodiment, the feedback mechanism enables connection of the user to a service after completion of the call being currently initiated. In another embodiment, the feedback mechanism provides for an immediate order placement, without requiring further connection.

In optional stage 4070, updated reimbursement rules are received responsive to the transmitted history of stage 4050. Optionally, the updated reimbursement rules are further responsive to the used descriptive data of stage 4000.

In optional stage 4080, the algorithm for selection of audio portions is modified so as to prevent repetitive replay of particular audio portions. Thus, in one non-limiting example in which the selection algorithm is operative to maximize total reimbursement, and a particular audio portion exhibits a reimbursement rate greater than all other audio portions, stage 4080 is operative to prevent repetitive replay of the single audio portion exhibiting the greater reimbursement rate. Stage 4080 is not limited to barring repetitive reimbursement, and in one embodiment stage 4080 is operative to ensure that a mix of audio portions is used as an additional factor in the selection of audio portions of stage 4030.

Thus, the present embodiments enable an on-board controlled audio agent provided with a plurality of audio portions to be output to an initiating caller until call connection with a voice response. In certain embodiments, associated with each of the audio portions is at least one reimbursement rule, and the controlled audio agent is operative to select the audio portion responsive to the reimbursement rules. Preferably the controlled audio agent is operative to select the audio portion so as to maximize total reimbursement responsive to the reimbursement rules.

In certain embodiments the controlled audio agent maintains a history of audio portions output to the caller, and uploads the history to a network maintenance and supervision agent. The network maintenance and supervision agent is operative to regularly provide updated reimbursement rules and audio portions responsive to the uploaded history.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

I claim:

1. A telephone comprising a system for on-board supervision of a controlled audio portion, the telephone comprising:
a functionality arrange to initiate a phone call from the telephone;
a controlled audio agent on-board the telephone and responsive to the initiate functionality of the telephone;
an audio portion storage on-board the telephone and associated with said controlled audio agent;
an audio output device associated with the telephone; and
a data communication module on-board the telephone, said data communication module arranged to download a plurality of audio portions from a network and store the downloaded plurality of audio portions on said audio portion storage,
said controlled audio agent arranged to:
receive from said initiate functionality an indication of a phone call initiation from the telephone;
select, for each phone call instance initiated by said telephone, a particular one of said stored plurality of audio portions from said audio portion storage; and
output, responsive to said received indication, said selected particular one of said stored plurality of audio portions on an audio output of the initiating telephone such that at least a portion of said selected particular audio portion is output by the initiating telephone associated audio output device prior to the phone call connection.

2. The telephone according to claim 1, further comprising a rule storage associated with said controlled agent, said rule storage exhibiting a plurality of rules associated with said stored audio portions,
wherein said selection of a particular one of said stored plurality of audio portions by said controlled agent is responsive to one of said plurality of rules.

3. The telephone according to claim 2, wherein said stored plurality of rules comprises reimbursement rules.

4. The telephone according to claim 3, wherein at least one of said stored plurality of reimbursement rules is dependent on at least one of frequency of selection and time of day.

5. The telephone according to claim 3, wherein said selection of said particular one of said stored plurality of audio portions is in accordance with an algorithm operative to maximize total reimbursement responsive to said stored plurality of reimbursement rules.

6. The telephone according to claim 1, further comprising:
a supervisory functionality on-board the telephone and in communication with said controlled audio agent and said audio portion storage, said data communication module in communication with said supervisory functionality,
wherein said supervisory functionality is arranged to:
maintain a history of said outputted plurality of audio portions on said audio portion storage;
transmit to said network, via said data communication module, said maintained history of said outputted plurality of audio portions;
receive from said network, via said data communication module, an additional audio portion; and
store said received additional audio portion on said audio portion storage.

7. The telephone according to claim 6, wherein said supervisory functionality is further arranged to:
receive from said network, via said data communication module, a reimbursement rule associated with an audio portion.

8. The telephone according to claim 6, further comprising a user input device on-board the telephone, said supervisory functionality in communication with said user input device and said audio portion storage,
wherein said supervisory functionality is arranged to:
receive a user input via said user input device;
store said received input on said audio portion storage; and
initiate a connection to said network responsive to said stored received input.

9. The telephone according to claim 8, wherein said output audio portion comprises an advertisement, and wherein said initiated connection to said network is to a network portion associated with a provider of said advertisement.

10. The telephone according to claim 1, wherein said controlled audio agent is further arranged to:
maintain a history of said outputted plurality of audio portions on said audio portion storage; and
prevent repetitive replay of a particular one of said stored plurality of audio portions responsive to said maintained history.

11. The telephone according to claim 1, wherein said data communication module is in communication with a commercial information server via said network and is further arranged to download said plurality of audio portions from said commercial information server.

12. The telephone according to claim 11, wherein said commercial information server is arranged to store a plurality of audio portions comprising at least one of advertisements, music, and composite information.

13. The telephone according to claim 11, further comprising a private information server in communication with said commercial information server and exhibiting descriptive data of said call initiator.

14. The telephone according to claim 13, wherein said call initiator descriptive data comprises at least one of age, sex, income, job description, and preferred hobby.

15. The telephone according to claim 13, wherein said downloaded plurality of audio portions are selected responsive to said call initiator descriptive data.

16. The telephone according to claim 13, wherein said downloaded plurality of audio portions are selected responsive to said call initiator descriptive data matching a target profile.

17. The telephone according to claim 13, further comprising:
a network maintenance and supervision agent in communication with said private information server; and
an audio portion source in communication with said commercial information server;
wherein said network maintenance and supervision agent is arranged to select and provide to said data communication module for download a plurality of selected audio portions according to said descriptive data of said call initiator, and
wherein said audio portion source is arranged to upload to said commercial information server updated audio portions.

18. The telephone according to claim 1, further comprising:
a call condition classifier on-board the telephone and further associated with a telephone network associated with said telephone, said call condition classifier in communication with said controlled audio agent and arranged to classify a condition of the initiated phone call as one of answered, awaiting voice response and failed,
wherein said controlled audio agent is further arranged to:
block passage of a ring back signal received from the telephone network to said caller responsive to classification of said call condition classifier of said initiated phone call condition as awaiting voice response; and
pass, responsive to classification of said call condition classifier of said initiated phone call condition as answered, audio information from a called party to said call initiator thereby disabling output of said selected particular audio portion.

19. The telephone according to claim 1, wherein at least one of said stored plurality of audio portions further exhibits one of an associated text, an associated image and an associated video portion, said controlled audio agent further arranged to:
display said one of an associated text, an associated image and an associated video portion to said call initiator on a display of said telephone.

20. The telephone according to claim 1, wherein said network is constituted by the Internet.

* * * * *